INVENTOR.
SIDNEY L. BENDELL
BY
Floyd M. Harris
ATTORNEY

TELEVISION BLACK LEVEL SETTING

Filed March 27, 1962 6 Sheets-Sheet 2

INVENTOR.
SIDNEY L. BENDELL
BY
Floyd M. Harris
ATTORNEY

INVENTOR.
SIDNEY L. BENDELL
BY
Floyd M. Harris
ATTORNEY

INVENTOR.
SIDNEY L. BENDELL
BY
Floyd M. Harris
ATTORNEY

TELEVISION BLACK LEVEL SETTING

Filed March 27, 1962

INVENTOR.
SIDNEY L. BENDELL
BY
Floyd M. Harris
ATTORNEY

INVENTOR.
SIDNEY L. BENDELL
BY Floyd M. Harris
ATTORNEY

United States Patent Office 3,126,447

Patented Mar. 24, 1964

3,126,447

TELEVISION BLACK LEVEL SETTING

Sidney L. Bendell, Haddon Heights, N.J., assignor to Radio Corporation of America, a corporation of Delaware Filed Mar. 27, 1962, Ser. No. 182,810
7 Claims. (Cl. 178—5.4)

This invention relates to improved black level setting systems and methods for television transmission, and particularly to improved black level setting in systems utilizing a picture pickup tube, such as a vidicon having a dark current output which is not a constant value. The invention further relates in some aspects to improved apparatus for picking up and transmitting scenes for color reproduction at the receiver, and particularly to an improved four pickup tube color camera employing three vidicons for providing the color signals and a high resolution pickup tube (an image orthicon) for providing the luminance signal as described in patent application S.N. 119,871, filed June 27, 1961, in the name of Alda V. Bedford and entitled "Color Television Camera System."

Picture pickup tubes of the type having a photoconductive screen or target are represented by the well-known vidicon. In operation, with the target being scanned by the electron beam, the output current includes what is referred to as dark current. The dark current is the output current that is obtained when the target is in darkness. For example, if the lens of a vidicon camera is capped, there will still be a vidicon output current as the beam scans the target because the resistance of the target is not infinite. This is the dark current. It ordinarily is not of constant value, since it increases with an increase in target voltage and, particularly, since it increases with an increase of the target temperature.

In television cameras employing vidicons, or similar type pickup tubes, the variations in dark current have, in the past, made it difficult to establish correctly the black level of the picture signal. For example, if the vidicon beam is blanked or cut off at the end of each horizontal sweep, the output current goes to zero. Since zero current does not represent picture black, a pedestal of adjustable height may be inserted during the blanking period, the height being adjusted to a level representing picture black. The operator, however, must watch the reproduced picture (on a monitor) and adjust the pedestal height until the picture has the right appearance.

In the case of color television cameras employing pickup tubes, such as vidicons, with photoconductive targets, the problems in correctly adjusting the pedestal height is more difficult than in black and white television since the color fidelity of the reproduced picture depends upon the pedestal height adjustment. Furthermore, in the four pickup camera described hereinafter the dark current of the vidicons is large because the vidicons are adjusted for high sensitivity, this adjustment including the use of a comparatively high target voltage.

An object of the invention is to provide an improved method of and means for setting the black level of video signals supplied from a picture pickup tube of the type having a photoconductive target.

A further object of the invention is to provide an improved television camera of the type using a picture pickup tube which has a photoconductive target.

A further object of the invention is to provide an improved color television camera.

A still further object of the invention is to provide an improved color television camera of the above-mentioned four pickup tube type.

In practicing a preferred embodiment of the invention, the vidicon, or other pickup tube having a photoconductive target, is provided with electrostatic deflection so that the retrace time can be short, thus providing a forward sweep portion that occurs during what would be part of the retrace time for magnetic deflection.

By means of a masking strip in the optical system, or a masking strip along one margin of the vidicon face plate, a dark strip (optical black) is formed along a margin of the photoconductive target. The additional forward sweep portion of the horizontal deflection wave that has been gained by using electrostatic deflection is used to sweep the vidicon beam across this dark strip. This establishes black level in the vidicon output signal. Each time the beam is deflected horizontally across the target the beam sweeps across the black strip and then continues its sweep across the target. Thus, a pedestal having a height representing true picture black is produced for each horizontal scan. By the use of direct current reinserters or clampers in the alternating current amplifier channel carrying the picture signal, correct picture black level is established automatically by clamping to the top of this pedestal, and there is no need for adjustment of the height of any pedestals in accordance with the individual judgment of an operator.

In the four pickup tube color camera employing a high resolution tube such as an image orthicon and three low resolution tubes, such as vidicons, having photoconductive targets, magnetic deflection is employed for the image orthicon and electrostatic deflection is employed for the vidicons so that there is a forward sweep deflection voltage for the vidicons during much of the retrace time for the image orthicon. Thus, optical black level setting may be obtained for the vidicon output signal without affecting the forward sweep time for the picture or scene.

The invention will be described in detail with reference to the accompanying drawing, in which, FIGURE 1 is a group of graphs showing the output signal from a vidicon when the vidicon electron beam is blanked or cut off at the end of each horizontal scan;

In the several figures, like parts are indicated by similar reference characters.

Figure 1:
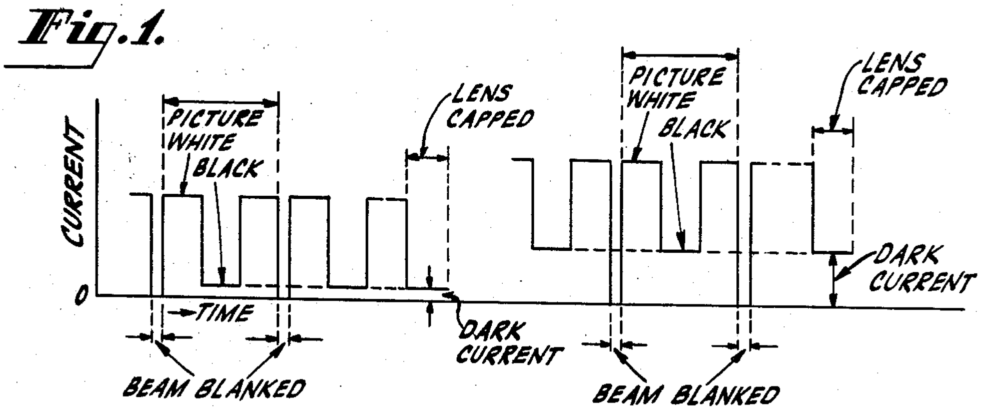

The graphs in FIGURE 1 show the output signal of a vidicon, first the signal with a small value of dark current, and next the signal sometime later with a larger value of dark current, the increase in dark current being due, for example, to an increase in the temperature of the photoconductive target. The picture is assumed to be a white bar, a black bar, and a second white bar. The vidicon beam is cut off or blanked at the end of each horizontal scanning line.

Referring to the first graph of FIGURE 1, there is zero output current during blanking, then a picture signal with current representing white followed by a low value of current representing picture black, and again a current value representing white. The next graph is the same as the first except that there is an increased value of dark current. It will be noted that zero current caused by beam blanking does not give any information as to picture black level.

Figure 2:
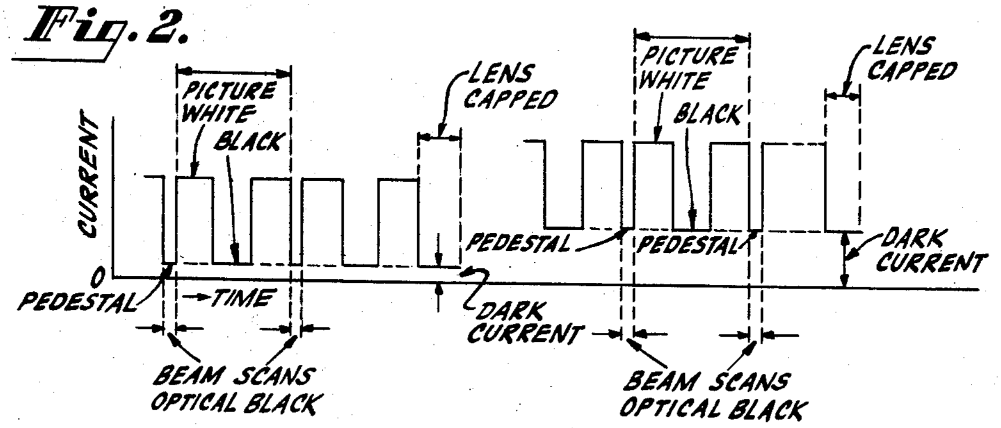
FIGURE 2 is a group of graphs showing the output signal from a vidicon when the vidicon electron beam scans across optical or picture black at the end of each horizontal scan.
Figure 6:
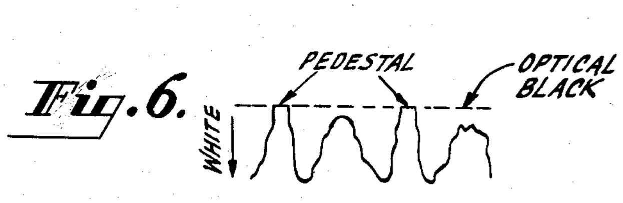
FIGURE 6 is a graph illustrating the signal that appears at the output of the vidicon shown in FIGURE 3.

FIGURE 2 is a set of graphs corresponding to those in FIGURE 1 except now the vidicon beam has not been blanked; instead, during most of the usual blanking time the vidicon beam has scanned across an optical black strip so that at the end of each horizontal scan the output signal represents optical or picture black. This portion of the signal is referred to as the pedestal. In FIGURE 6 there is a showing of vidicon output signal with the signal inverted as compared with FIGURE 2. As shown in FIGURE 6 the top of the pedestal always represents optical black.

Referring again to FIGURE 2, it will be noted that in the graph showing increased dark current the vidicon output signal is the same as before, the pedestal again representing optical black, except for the increased direct-current component due to increased dark current. Since the viidcon signal is passed through an A.-C. amplifier, the direct current component disappears. Direct current is restored to the proper level by clamping on the pedestal representing optical black.

Figure 3:
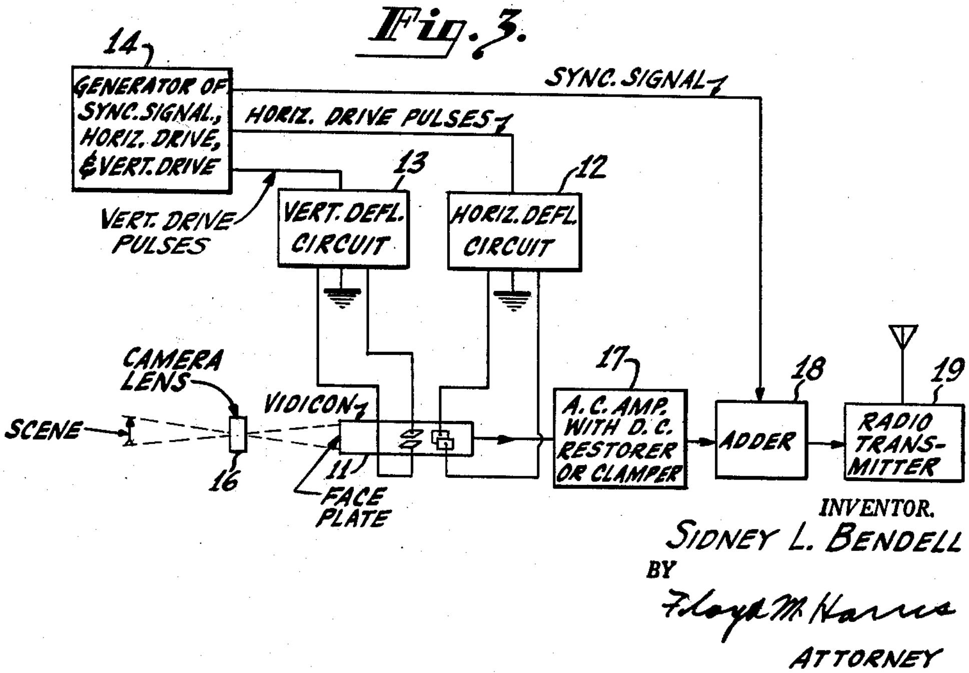
FIGURE 3 is a block diagram of a television transmitting system which employs a black and white television camera embodying the invention.

FIGURE 3 illustrates an embodiment of the invention as applied to a black and white camera using a vidicon pickup tube. The camera comprises a vidicon 11 provided with deflecting plates for both horizontal and vertical electrostatic deflection. The horizontal and vertical sawtooth deflection waves with very short return time are supplied from the horizontal deflection circuit 12 and the vertical deflection circuit 13.

The deflection circuits 12 and 13 are driven or triggered by drive pulses supplied from a generator 14 which also supplies the synchronizing signal to be transmitted.

The camera lens for imaging the scene on the vidicon target is indicated at 16. The vidicon output signal is supplied to an A.-C. amplifier 17. The amplified signal is supplied to an adder circuit 18 where the synchronizing signal is added to produce a combined signal that is supplied to a radio transmitter 19. At one or more points in the channel 17, 18 the direct current component may be restored by D.-C. restoring circuits or clamp circuits, the tops of the pedestals (see FIGURE 6) representing picture black being the level to which the signal is clamped.

Figure 4:
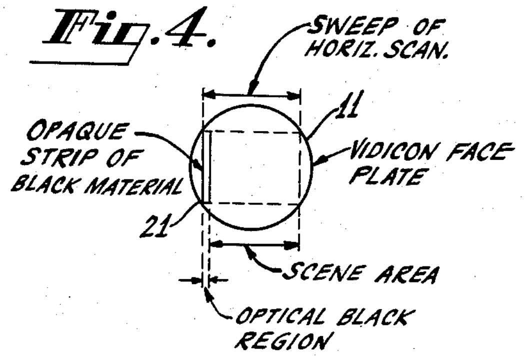
FIGURE 4 is an enlarged view of the face plate of the vidicon shown in FIGURE 3.
Figure 5:
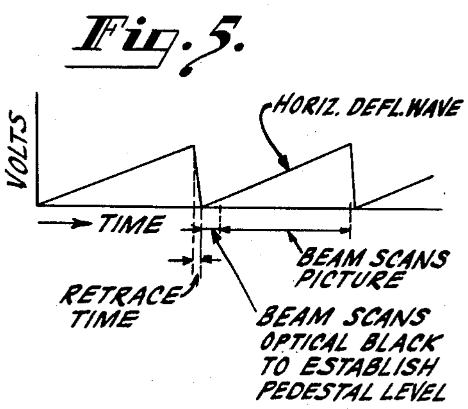
FIGURE 5 is a graph showing the horizontal deflection wave applied to the vidicon shown in FIGURE 3.

Reference to FIGURES 4 and 5 will show how the top of the pedestal is made to represent optical black regardless of the value of dark current. FIGURE 4 is an enlarged view of the face plate of the vidicon 11. Along one edge of the area corresponding to that scanned by the vidicon beam there is a strip of opaque material 21 which is cemented to the outside surface of the face plate. The strip 21 preferably is a dead black to avoid light scattering. Thus, behind the strip the photoconductive target has no light on it (assuming no light scattering) and is optical black. As indicated by the legends in FIGURES 4 and 5, at the end (or beginning) of each horizontal sweep of the electron beam it sweeps across the black strip appearing on the vidicon target whereby the pedestals in the output signal go to the optical black level as shown in FIGURE 6.

The retrace time of both the horizontal deflecting wave and the vertical deflecting wave may be made so short that no retrace blanking is required. For example, if the retrace time is about one microsecond the effect of the retrace is not visible on the reproduced picture.

Figure 7:
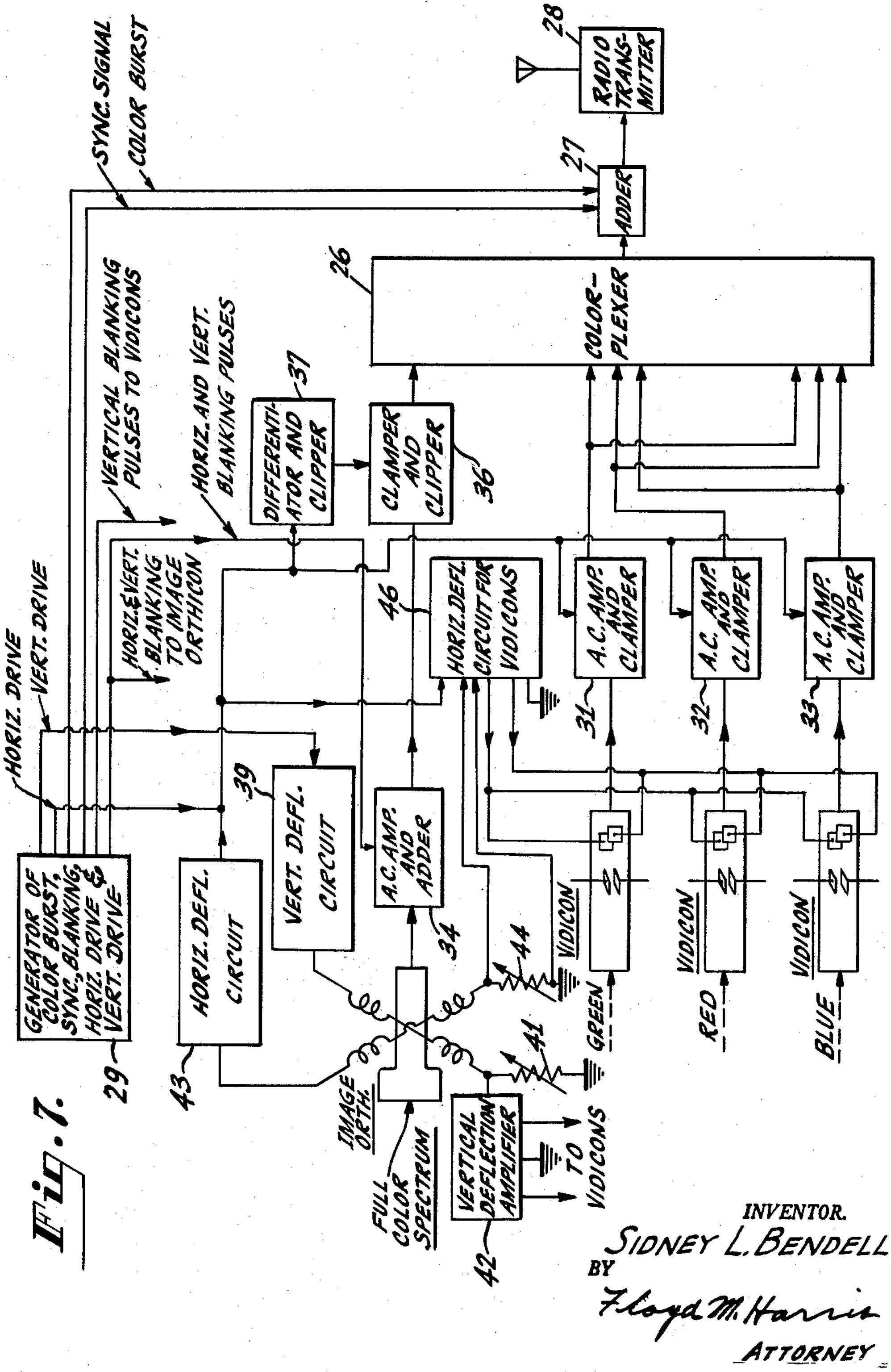
FIGURE 7 is a block diagram of a television transmitting system which employs a four pickup tube color camera embodying the invention.

FIGURE 7 is a block diagram of a four pickup tube color camera embodying the present invention. The camera is of the type described in the above-identified Bedford application in which the three vidicons, respectively, pick up three primary colors such as the red, green, and blue of the scene and a high resolution tube such as an image orthicon picks up the complete color spectrum of the scene. As an example of the pickup tubes that may be used, the image orthicon may be the RCA type 7295A and the vidicons may be type 7522 manufactured by General Electrodynamics Corporation. As explained in the Bedford application, the low resolution vidicons provide the three different color signals from which the color-difference signals are derived. The high resolution image orthicon provides the luminance signal which is transmitted with the color-difference signals. The color signals and the luminance signal are applied to a conventional colorplexer 26 where they are processed to obtain the video signal for transmission. The colorplexer output is supplied to a circuit represented by adder 27 where the synchronizing signal and the color burst are added to the colorplexer output. The combined signals are supplied to the radio transmitter 28.

The synchronizing signal and the color burst are supplied from a generator 29. This generator also supplies vertical and horizontal blanking pulses, and horizontal and vertical drive pulses for the deflection circuits.

The three vidicon outputs are fed to the colorplexer 26 through A.-C. amplifiers including D.-C. setters or clampers as represented at 31, 32 and 33, respectively. The image orthicon output is fed through an alternating-current amplifier and adder 34 where blanking pulses are added, and then to a keyed clamper and clipper 36 for setting the black level of the output. The clamper may be keyed by differentiated and clipped horizontal drive pulses as indicated by the block 37 to obtain the black level setting as explained later, or it may be keyed by narrow pulses suitably delayed by a delay circuit.

As described in connection with the camera of FIGURE 3, each of the three vidicons is operated with a picture black strip along one side of its screen or target so that the horizontal sweeps of the vidicon beam sweep over the black strip. An opaque strip of material may be cemented on the vidicon face plate as illustrated in FIGURE 4 to obtain the black strip on the target. In the specific example being described, however, the black strip on the target is formed by an opaque strip on the field lens of the optical system used to image the scene on the vidicons as will be describebd later with reference to FIGURE 8.

In the embodiment of the invention illustrated in FIGURE 7, the image orthicon is provided with electromagnetic deflection and the vidicons are provided with electrostatic deflection, the return time of the horizontal electrostatic deflection being so short that there is a substantial forward sweep portion of this deflection that occurs during the return time of the electromagnetic deflection. This is illustrated in FIGURE 9.

Figure 9:
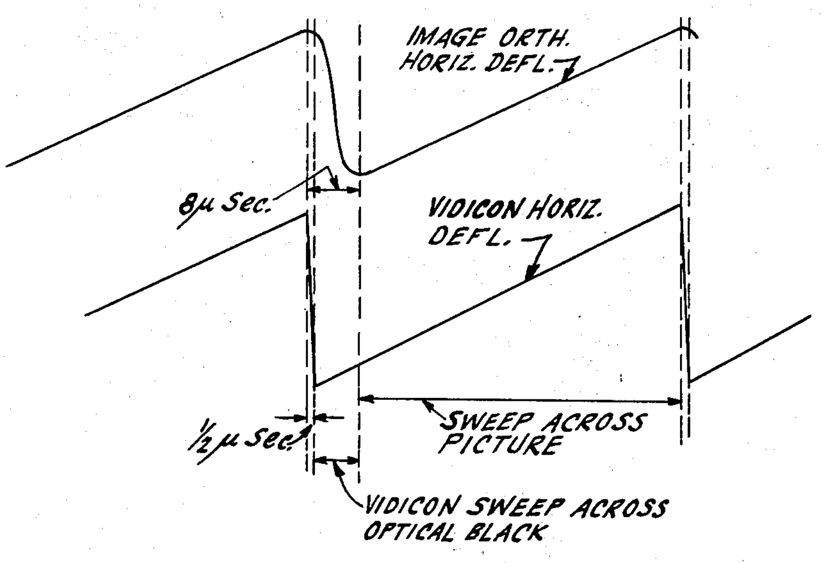
FIGURE 9 is a pair of graphs illustrating the horizontal deflection for the image orthicon and for the vidicons.

The first graph of FIGURE 9 shows the current flowing through the horizontal deflection coil of the image orthicon. The return time is about eight or ten microseconds. This may be a convention deflection circuit provided with the usual centering control (not shown). The second graph shows the horizontal deflection voltage applied to the horizontal deflection plates of the vidicons. The return time is made very short, preferably less than one microsceond. In the example illustrated the return time is one-half microsecond. It will be noted that with this short return time part of the horizontal forward sweep for the vidicons is occurring during the return time of the image orthicon horizontal deflection and, as indicated by the legend, this part of the horizontal forward sweep is sweeping the vidicon beam across the strip of picture black or optical black. Thus, black level is set for the vidicon output, and there is no reduction in the forward sweep time available for the picture or scene. It may be noted that if there is any light scattering in the vidicon that reaches the optical black strip, the signal level set by the black strip still represents picture black in the reproduced picture.

Before considering the horizontal deflection in more detail, the vertical deflection means shown in FIGURE 7 will be described. The electromagnetic vertical deflection for the image orthicon is provided by a deflection circuit 39 driven by the vertical drive pulses and is conventional except that a low impedance sampling resistor 41 (preferably adjustable) is connected in series with the vertical deflection coil. The voltage appearing across resistor 41 has the same waveform as that of the current flowing through the deflection coil. The voltage is applied to a vertical deflection amplifier 42 which supplies to the vertical deflection plates of the three vidicons a deflection voltage of the same wave shape as that appearing across resistor 41. The deflection circuit includes suitable size control means (not shown) for adjusting the deflection size at each vidicon. Also, suitable centering means (not shown) as provided. It will be evident that the use of this deflection circuit for the vidicons make it easy to insure that the vidicon vertical deflection tracks with the image orthicon vertical deflection.

Referring again to the horizontal deflection, and particularly to the specific example illustrated in FIGURE 7, the electromagnetic horizontal deflection for the image orthicon is provided by a horizontal deflection circuit 43 driven by the horizontal drive pulses and is conventional except that a low impedance sampling resistor 44 is connected in series with the horizontal deflection coil. The voltage appearing across resistor 44 has the same wave form as that of the current flowing through the horizontal deflection coil. It is supplied to a horizontal deflection circuit 46. In order to obtain a horizontal deflection voltage that has a forward sweep occurring during the horizontal retrace time of the image orthicon deflection as shown in FIGURE 9, the horizontal drive pulses are also supplied to the deflection circuit 46 for generation of a forward sweep wave occurring during image orthicon deflection retrace. In the deflection circuit 46 this forward sweep wave is added to the main forward sweep wave derived from the resistor 44 to obtain the vidicon horizontal deflection wave shown in FIGURE 9. The details of the deflection circuit 46 will be described hereinafter.

The horizontal and vertical electrostatic deflection circuits for the vidicons need not be of the types illustrated in FIGURE 7. Instead they may be deflection circuits of types well known in the art. For example, the vidicon horizontal electrostatic deflection circuit may be of the type shown in FIGURE 10 or any one of various other well known types. It will supply the vidicon deflection wave shown in FIGURE 9 and shown in FIGURE 11 as wave 50. The circuit comprises a capacitor 47 which is gradually charged by a battery 48 through a resistor 49. The capacitor 47 is periodically discharged through a grid-controlled vapor tube 51 by a trigger pulse 52. The circuit elements 47, 48 and 49 preferably are adjustable to facilitate proper adjustment to make the vidicon horizontal deflection track with the image orthicon horizontal deflection. The circuit of FIGURE 10 may be triggered in the manner illustrated in FIGURE 11.

Figure 10:
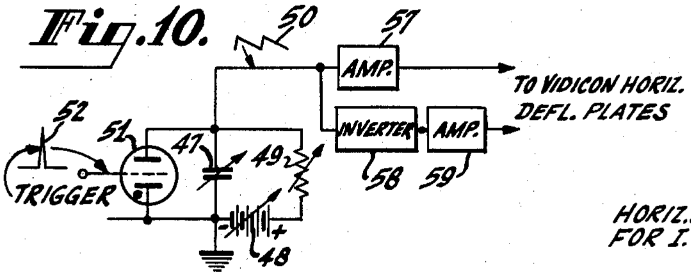
FIGURE 10 is a circuit and block diagram of an electrostatic deflection circuit that may be used in the camera shown in FIGURE 7.
Figure 11:
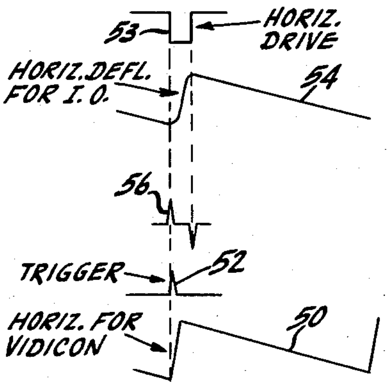
FIGURE 11 is a group of graphs that are referred to in describing the way in which the deflection circuit of FIGURE 10 is driven.

Referring to FIGURE 11, the horizontal drive pulse 53 is the one that drives the horizontal deflection circuit to produce the deflection current wave 54 for the image orthicon. The drive pulse 53 is differentiated to produce the wave 56 which is then clipped to produce the trigger pulse 52. The trigger pulses 52 trigger the circuit of FIGURE 10 to produce the voltage wave 50 which appears across the capacitor 47. The return time of wave 50 is made very short so that, as shown in FIGURE 11, a portion of the forward trace occurs within the return time of the electromagnetic deflection wave 54. Also, the return time is so short that it is not necessary to blank the vidicons during the retrace period.

The deflection wave 50 may be applied with one polarity to one plate of the pair of horizontal deflection plates in the vidicon by way of an amplifier 57, and applied with the opposite polarity to the other plate of the pair by way of a polarity inverter 58 and an amplifier 59.

The vertical electrostatic deflection for the vidicons may be provided in the same way as described for horizontal deflection with reference to FIGURES 10 and 11. In the case of vertical deflection it is the vertical drive pulse that is differentiated to obtain the deflection circuit trigger pulse. The return time may be made very short as in the case of vidicon horizontal deflection, if desired, so that there is no need to blank the vidicons during the vertical retrace period. If preferred, the vertical deflection may be provided in the manner illustrated in FIGURE 7.

Figure 12:
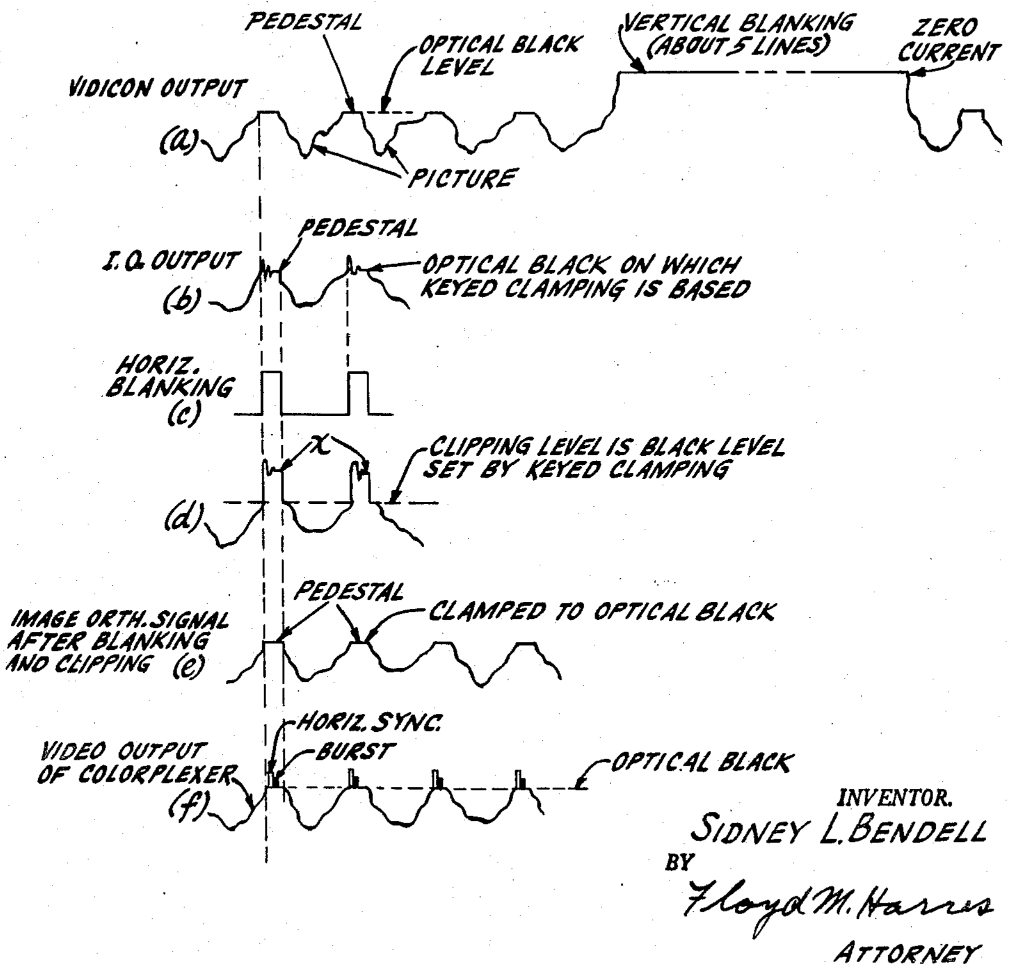
FIGURE 12 is a group of graphs representing picture signals and blanking and synchronizing pulses that appear at different points in the camera shown in FIGURE 7.

Refer now to the graphs of FIGURE 12 which show signals as they appear at various points in the system of FIGURE 7. Graph (*a*) represents the signal that appears at the output of each of the three vidicons. At the end (or beginning) of each horizontal scan producing picture signal there is the scan across optical black to produce a pedestal having a height that is at picture black level. Because of the speed of the return trace, no horizontal blanking at the vidicons is provided.

Vertical blanking is applied to the vidicons in the example of FIGURE 7, however, since the vertical deflection wave for the vidicons is taken off resistor 41 so that the vertical return time is the same as that for the image orthicon and, therefore, is of substantial duration. Since the vertical blanking pulse cuts off the beam of the vidicon, the vidicon output is zero during the vertical blanking period, as shown in graph (*a*), and does not represent optical black. It is evident that the vidicon output should be clamped to the tops of the pedestals which are at black level, and not to the zero current level. In the example of FIGURE 7 the horizontal drive pulses are supplied to the units 31, 32 and 33 in the vidicon channels as keying pulses for operating keyed clampers in these units. In the example illustrated, there is no provision for switching off the keying pulses during vertical blanking because this blanking lasts for only a few scanning lines (about five). This is such a small percentage of the total number of lines that the resulting error in black level setting is insignificant providing the clamping circuit has suitable time constants. During the period the clamping circuit is keyed on for introducing a correction, the time constant for the correction should be short. During the period the clamping circuit is inactive, i.e., between keyed-on periods, the time constant of store or holding portion of the clamping circuit should be comparatively long.

Graph (*b*) of FIGURE 12 represents the image orthicon output. During the horizontal return trace, during which the image orthicon target is blanked, the pedestal is formed with a height at optical black, but usually some unwanted signal appears on part of the pedestal. To remove this unwanted signal the image orthicon output is supplied to the adder circuit 34 (FIGURE 7) where horizontal blanking pulses shown in graph (*c*) (FIGURE 12) are added to obtain a signal of the form shown in graph (*d*).

The output of adder 34, graph (*d*), is supplied to the clamper and clipper 36 where it is clipped at black picture level to obtain the signal of graph (*e*). This signal now has clean pedestals with their tops at the optical black level. In order to clip the signal (*d*) at the picture black level, it is clamped on the later occurring portion *x* of the pedestal that is free from signal corruption. A fixed bias is set with reference to this clamping level to clip the signal at black level. The keying pulses for clamping on the portions *x* may be narrow pulses that have been suitably delayed by a delay line, or they may be obtained from the circuit 37 which differentiates the horizontal drive pulses, and inverts and clips the differentiated wave to obtain a keying pulse occurring during the "clean" portion of the blanking pulse.

The graph (*f*) of FIGURE 12 represents the signal during horizontal scanning as it appears at the output of the adder 27 after the synchronizing signal and the color burst have been added to the signal output of the colorplexer.

Figures 8, 8A:
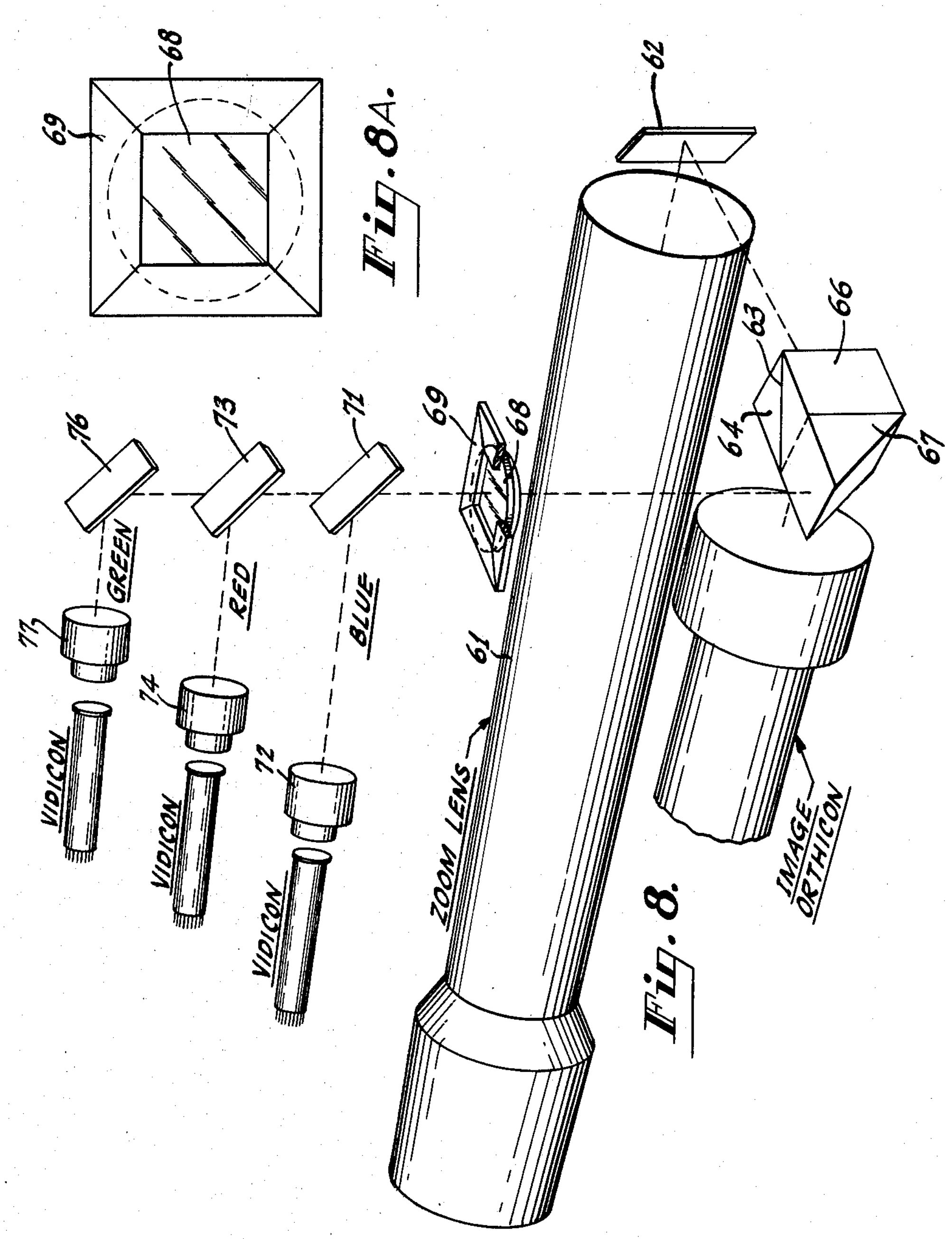
FIGURE 8 is a perspective view of an optical system that may be employed for imaging the scene on the pickup tubes.
FIGURE 8A is a plan view of the field lens and its supporting frame embodied in the optical system of FIGURE 8.

Brief mention has been made of the optical system, shown in FIGURE 8, for imaging a scene on the pick-up tubes. This system, which is only one specific example of what may be used, will now be described in more detail.

The optical system shown in FIGURE 8 is of the general type indicated schematically in the above-identified Bedford application. In the specific embodiment of FIGURE 8 a variable focal length or zoom lens 61 is used to pick up the scene to be televised. The light rays from the lens 61 are directed by a mirror 62 to a partially reflecting surface 63 which directs 20 percent of the light to the image orthicon photocathode on which the scene is imaged. The surface 63 may be a partially silvered surface and is on the 45 degree surface of a right angle prism 64. A second right angle prism 66 has its 45 degree surface cemented to the surface 63. A right angle prism 67 is cemented to the prism 66 to reflect the remaining 80 percent of the light upward to a field lens 68 located where the image of the scene is formed in space.

The field lens 68 is supported by a metal frame 69 which, since the frame extends slightly over the lens as shown more clearly in FIGURE 8A, causes the scene image to be projected on the vidicon targets with a dark strip along the edge of the scene image.

Light collected by the lens 68 passes to a dichroic mirror 71 which reflects the blue light of the scene to a camera lens 72. The lens 72 images the blue portion of the scene on the target of one of the three vidicons. The red portion of the light passing through the dichroic mirror 71 is reflected from a dichroic mirror 73 to a camera lens 74 which images the red portion of the scene on the target of another one of the vidicons. The light passing through the dichroic mirror 73 is the green portion of the scene which is reflected by a mirror 76 to a camera lens 77 which images the green portion of the scene on the target of the third vidicon.

A specific example of a suitable circuit for the horizontal electrostatic deflection circuit 46 of FIGURE 7 will now be described with reference to FIGURE 13. This specific circuit is described in application Serial No. 182,781, filed on the same day as the present application, in the name of Robert A. Dischert and entitled "Deflection Circuit." It will be recalled that with the circuit 46 the portion of the deflecting wave that sweeps the vidicon beam across the picture image is derived from the electromagnetic deflection circuit so that the horizontal scan for the vidicons is easily made to track with the horizontal scan for the image orthicon. Also, to obtain a deflection wave that has a forward sweep portion occurring during the image orthicon retrace, an additional forward sweep wave portion is combined with the picture image sweep portion.

Figure 13:
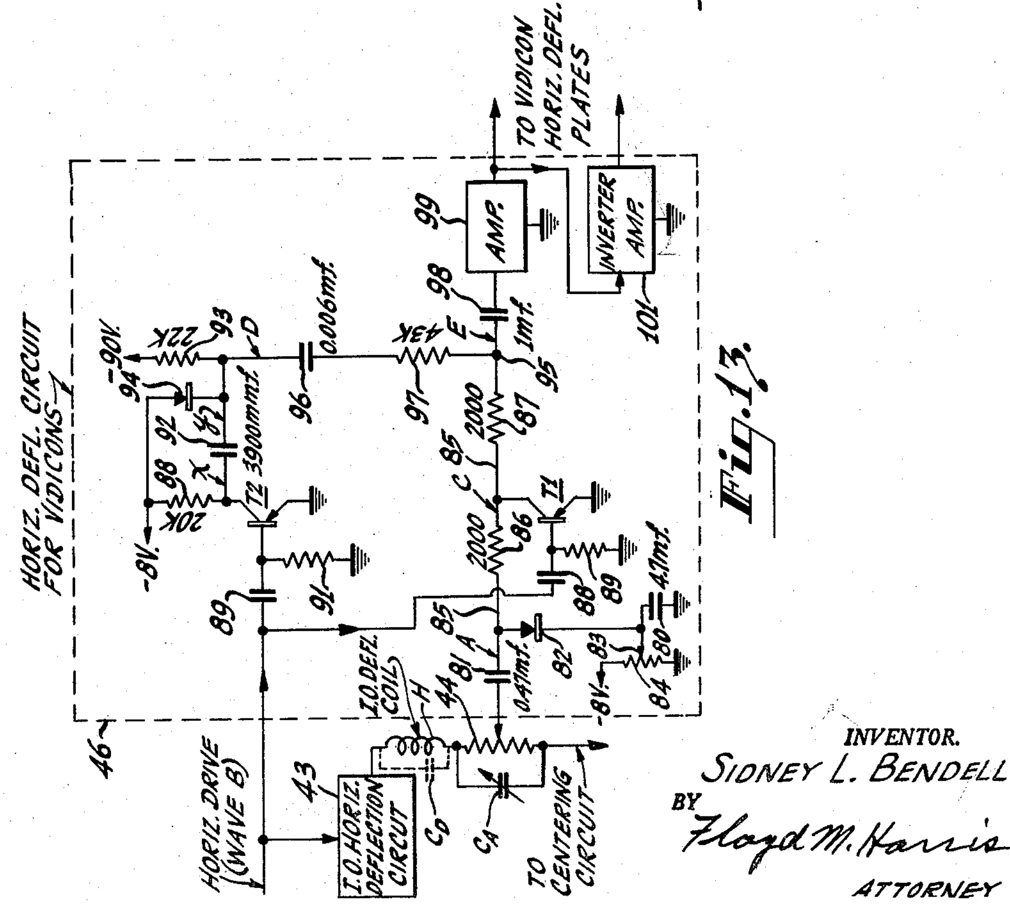
FIGURE 13 is a circuit and block diagram of another electrostatic deflection circuit that may be used in the camera shown in FIGURE 7.

Referring to FIGURE 13, the forward sweep portion of the deflection wave is taken off the sampling resistor 44 through which the image orthicon deflection current flows. The lower end of this resistor is indicated as going to a conventional centering circuit. The voltage wave from resistor 44 is applied through a coupling capacitor 81 to a conductor line 85. A diode for D.-C. setting has its anode connected to the conductor line 85. The cathode of diode 82 is connected to an adjustable tap 83 on a potentiometer 84 so that the cathode may be set either at ground or at a slightly negative potential. A by-pass capacitor 80 may be provided. The capacitor 81 and diode 82 act as a D.-C. setter so that the wave from resistor 44 is as shown at A in FIGURE 14 with the positive peak of the wave set at approximately zero volts. This setting is obtained because the positive peak of wave A makes the diode 82 conduct so that the anode side of the diode goes nearly to the potential of the tap 83 which, in this example, is assumed to be set at ground potential. The anode side of diode 82 may be set exactly to zero volts if desired by setting the tap 83 at a slightly negative potential to compensate for the smalll voltage drop through the diode.

It may be noted that because of stray capacity $C_D$ across the horizontal deflection coil H the current flow through the sampling resistor 44 will be the current flowing through the coil H plus an error current unless a correction means is provided. In the absence of such correction some bars at one side of the picture display may be apparent. A suitable correction means may consist of a capacitor $C_A$ connected across the sampling resistor 44. The ratio of the impedance of sampling resistor 44 to the impedance of $C_A$ should be approximately equal to the ratio of the impedance of coil H to the impedance of $C_D$, these impedance values being those at the frequency of oscillation of the coil H with its distributed capacity $C_D$ which oscillation is initiated by the deflection return. This frequency usually is about 60 kilocycles per second. The capacitor $C_A$ preferably is adjustable so that, after a selection of the approximately correct value, its value may be adjusted to more completely eliminate the effect of the error current. It may be noted, merely by way of example, that in one particular deflection circuit a suitable value for $C_A$ was 0.033 microfarad where the value of the sampling resistor 44 was 8 ohms.

Figure 14:
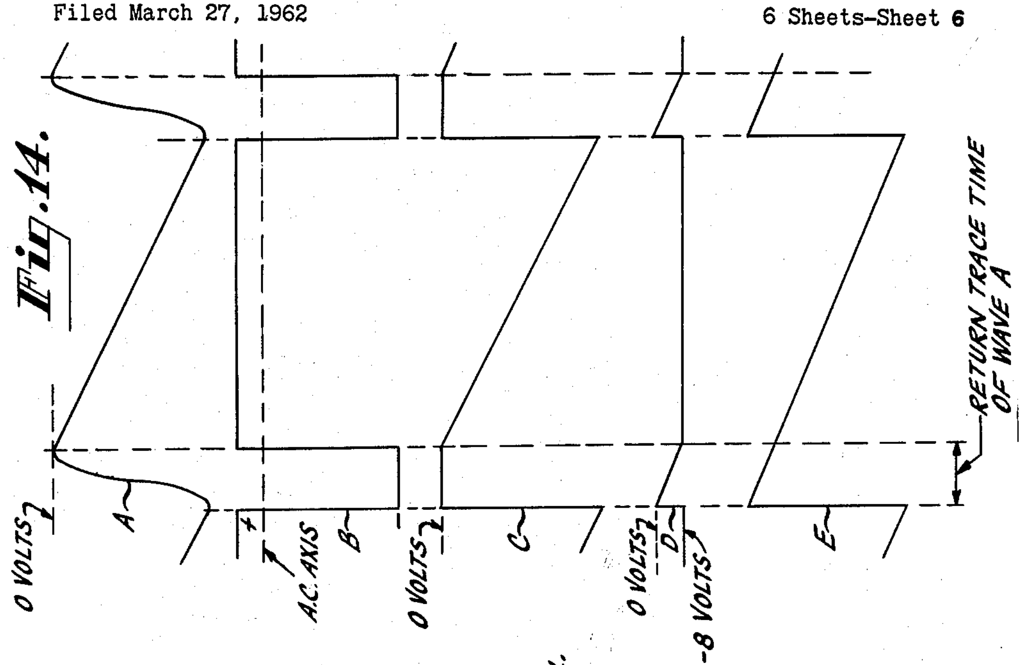
FIGURE 14 is a group of graphs that are referred to in explaining the operation of the circuit of FIGURE 13.

The wave C shown in FIGURE 14 is obtained by use of a clamping circuit which comprises a transistor T1 that is driven to saturation by the horizontal drive wave B shown in FIGURE 14. The emitter of T1 is connected to ground. The collector of T1 is connected to the conductor line 85 at a point between a resistor 86 and a resistor 87 that are connected in series relation in the conductor line 85. Reference to wave A of FIGURE 14 will show that as soon as the D.-C. setter 81, 82 has established the peak of wave A at zero volts, the rising portion of the wave occurring during the return time is always negative, that is, below ground potential. This negative voltage feeds through the resistor 86 to the collector of T1, thus applying an operating voltage to the collector so that T1 can be driven to saturation. The resistor 86 is provided to limit the current drawn from capacitor 81, and also to minimize the requirements for saturation current needed in transistor T1. The resistor 87 is an adding resistor, as will be understood later, which terminates at a junction point 95.

The horizontal drive pulses (wave B of FIGURE 14) are applied with negative polarity through a coupling capacitor 88 to the base of transistor T1. An input resistor 89 is connected between the base and ground. The horizontal drive pulses drive the transistor T1 to saturation to thereby hold the wave C at zero volts during the return trace time of the wave A. Immediately following the negative pulse portion of wave B, the wave B applies a slightly positive voltage to the base of T1 which holds it cut off until the next pulse portion occurs. Thus the voltage wave C is applied to the adding resistor 87.

In order to obtain the desired sawtooth voltage wave E of FIGURE 14, the wave D of FIGURE 14 is generated and added to the wave C. The wave D is generated by a circuit that includes a transistor T2. The emitter of transistor T2 is grounded; its collector is connected through a resistor 88 to a negative voltage, minus 8 volts in this example. The negative horizontal drive pulses (wave B are applied a coupling capacitor 89 to the base of transistor T2. An input resistor 91 is connected form the base of T2 to ground.

A capacitor 92 has one side connected to the collector of T2, and has the other side connected through a resistor 93 to a comparatively high negative voltage, minus 90 volts in this example. A diode 94 is connected between the minus 8 volt source and the minus 90 volt side of the capacitor 92, the anode being connected to the minus 8 volt source. The minus 90 volt side of capacitor 92 is connected through a coupling capacitor 96 and an adding resistor 97 which terminates at the junction point 95.

The generation of the wave D will now be described. Between the negative pulses of the wave B the transistor T2 is virtually an open circuit so that the voltage at both points $x$ and $y$ on opposite sides of the capacitor 92 must be equal to minus 8 volts. This is apparent since with T2 open (cut-off) there is no current flow through resistor 88 and point $x$ must be at minus 8 volts. The point $y$ is at minus 8 volts since point $y$ can settle toward minus 90 volts only until it reaches minus 8 volts; beyond minus 8 volts the diode 94 conducts and shorts the point $y$ to minus 8 volts.

When the negative pulse of wave B occurs it drives transistor T2 to saturation and forces its collector to go to approximately zero volts. Since there is no charge on capacitor 92, the point $y$ also momentarily goes to zero volts, and the diode 94 is opened up (becomes non-conducting).

Capacitor 92 now begins to charge toward minus 90 volts. When the point $y$ reaches 8 volts, diode 94 conducts and holds the point $y$ at minus 8 volts. The value of resistor 93 is selected so that point $y$ reaches minus 8 volts at the termination of the negative horizontal drive pulse (wave B). When the negative pulse terminates, the transistor T2 again opens up and the capacitor 92 discharges to its initial condition of zero charge. The discharge path of capacitor 92 is through resistor 88 and diode 94.

Thus the voltage wave D is generated and applied through the coupling capacitor 96 to the adding resistor 97. The waves C and D appear added at junction point 95, the added waves being the wave E, and they are applied through a coupling capacitor 98 to a transistorized amplifier 99 which has substantially zero input impedance. The output of this amplifier is, for example, of positive polarity and is applied to one plate of the horizontal deflection plates of the vidicons. The output of amplifier 99 is also applied to a polarity inverting amplifier 101 of one-to-one gain which supplies an opposite polarity deflecting wave to the other plate of each pair of horizontal deflecting plates.

Referring more specifically to the addition of the waves C and D, it is a current addition. Since the amplifier 99 has substantially zero input impedance, the voltage wave C produces a current at junction point 95 that is a function of the waveform of wave C only. Similarly, the voltage wave D produces a current at junction point 95 that is a function of the waveform of wave D only. The two currents add to form the current wave E which is amplified by amplifiers 99 and 101 to produce the desired deflection voltage of corresponding waveform.

In FIGURE 13 certain capacitor and resistor values are given merely by way of example. These values are given in microfarads, micro-microfarads, ohms and thousands of ohms.

If desired, the deflection circuit 46 of FIGURE 7 may be the deflection circuit described in application Serial No. 182,855, filed on the same day as the present application in the names of Sidney L. Bendell and William J. Cosgrove and entitled "Deflection Circuit," now Patent 3,089,978 issued May 14, 1963.

What is claimed is:

1. A television camera comprising a pickup tube having a target or screen that is to be scanned by an electron beam, said tube having a deflection coil through which a deflection current is to flow for deflecting said beam horizontally at a comparatively fast rate to scan said target, said camera further comprising at least one pickup tube of the type having a photoconductive target or screen that is to be scanned by an electron beam and having deflection means to which a deflection wave is to be applied for deflecting the associated electron beam horizontally at said comparatively fast rate to scan the photoconductive target, horizontal deflection circuit means for producing a repetitive horizontal deflection current which flows through said deflection coil, said deflection current having a waveform that includes a forward sweep portion and a return time portion, further horizontal deflection circuit means for producing a repetitive horizontal deflection wave which is applied to said horizontal deflecting means, said deflection wave having a waveform that includes a forward sweep portion part of which occurs during the return time of said deflection current and having a comparatively short return time portion, means for producing an optical black strip along one side of said photoconductive target, said strip being substantially at right angles to the direction of horizontal scan, optical means for imaging the scene to be transmitted on the targets of said pickup tubes, the horizontal deflection wave applied to said horizontal deflecting means being made to deflect the associated electron beam across both the picture image and the optical black strip, whereby the output of said pickup tube having the photoconductive target comprises the picture signal obtained by each horizontal scan followed by a black level pedestal having a peak level that always is representative of picture black.

2. A television camera comprising a luminance pickup tube having a target or screen that is to be scanned by an electron beam, said tube having a deflection coil through which a deflection current is to flow for deflecting said beam horizontally at a comparatively fast rate to scan said target, said camera further comprising three color pickup tubes each having a target or screen that is to be scanned by an electron beam, said color pickup tubes each having deflection means to which a deflection wave is to be applied for deflecting the associated electron beam horizontally at said comparatively fast rate to scan the target, horizontal deflection circuit means for producing a repetitive horizontal deflection current which flows through said deflection coil, said deflection current having a waveform that includes a forward sweep portion and a return time portion, further horizontal deflection circuit means for producing a repetitive horizontal deflection wave which is applied to said horizontal deflecting means of the color pickup tubes, said deflection wave having a waveform that includes a forward sweep portion part of which occurs during the return time of said deflection current and having a comparatively short return time portion, means for producing an optical black strip along one side of each of said targets of the color pickup tubes, said strip being substantially at right angles to the direction of horizontal scan, optical means for imaging the scene to be transmitted on the targets of said four pickup tubes with the image in full color on the target of the luminance pickup tube, and with the image in three primary colors, respectively, on the targets of the color pickup tubes, the horizontal deflection wave applied to said horizontal deflecting means being made to deflect the associated electron beam across both the picture image and the optical black strip, whereby the output of each of said color pickup tubes comprises the picture signal obtained by each horizontal scan followed by a black level pedestal having a peak level that always is representative of picture black, means for deriving from the outputs of said color pickup tubes a color subcarrier which carrier color difference signals representative of a scene, and means for adding the output of said luminance pickup tube as a luminance signal to said color subcarrier to produce a combined signal representative of said scene.

3. A television camera comprising a luminance pickup tube having a target or screen that is to be scanned by an electron beam, said tube having a deflection coil through which a deflection current is to flow for deflecting said beam horizontally at a comparatively fast rate to scan said target, said camera further comprising three color pickup tubes of the type having a photoconductive target or screen that is to be scanned by an electron beam, said color pickup tubes each having deflection means to which a deflection wave is to be applied for deflecting the associated electron beam horizontally at said comparatively fast rate to scan the photoconductive target, horizontal deflection circuit means for producing a repetitive horizontal deflection current which flows through said deflection coil, said deflection current having a waveform that includes a forward sweep portion and a return time portion, further horizontal deflection circuit means for producing a repetitive horizontal deflection wave which is applied to said horizontal deflecting means, said deflection wave having a waveform that includes a forward sweep portion part of which occurs during the return time of said deflection current and having a comparatively short return time portion, masking means for producing an optical black strip along one side of each of said photoconductive targets, said strip being substantially at right angles to the direction of horizontal scan, optical means for imaging the scene to be transmitted on the targets of said four pickup tubes with the image in full color on the target of the luminance pickup tube, and with the image in three primary colors, respectively, on the targets of the color pickup tubes, the horizontal deflection wave applied to said horizontal deflecting means being made to deflect the associated electron beam across both the picture image and the optical black strip, whereby the output of each of said color pickup tubes comprises the picture signal obtained by each horizontal scan followed by a black level pedestal having a peak level that always is representative of picture black, means for deriving from the outputs of said color pickup tubes a color subcarrier which carries color difference signals representative of a scene, and means for adding the output of said luminance pickup tube as a luminance signal to said color subcarrier to produce a combined signal representative of said scene.

4. A television camera comprising a luminance pickup tube having a target or screen that is to be scanned by an electron beam, said tube having a deflection coil through which a deflection current is to flow for deflecting said beam horizontally at a comparatively fast rate to scan said target, said camera further comprising three color pickup tubes of the type having a photoconductive target or screen that is to be scanned by an electron beam, said color pickup tubes each having a pair of electrostatic deflection plates to which a deflection voltage is to be applied for deflecting the associated electron beam horizontally at said comparatively fast rate to scan the photoconductive target, horizontal deflection circuit means for producing a repetitive horizontal deflection current which flows through said deflection coil, said deflection current having a waveform that includes a forward sweep portion and a return time portion, further horizontal deflection circuit means for producing a repetitive horizontal deflection voltage which is applied to said horizontal deflecting plates, said deflection voltage having a waveform that includes a forward sweep portion part of which occurs during the return time of said deflection current and having a comparatively short return time portion, means for producing an optical black strip along one side of each of said photoconductive targets, said strip being substantially at right angles to the direction of horizontal scan, optical means for imaging the scene to be transmitted on the targets of said four pickup tubes with the image in full color on the target of the luminance pickup tube, and with the image in three primary colors, respectively, on the targets of the color pickup tubes, the horizontal deflection voltage applied to said horizontal deflecting plates being made to deflect the associated electron beam across both the picture image and the optical black strip, whereby the output of each of said color pickup tubes comprises the picture signal obtained by each horizontal scan followed by a black level pedestal having a peak level that always is representative of picture black, means for deriving from the outputs of said color pickup tubes a color subcarrier which carries color difference signals representative of a scene, and means for adding the output of said luminance pickup tube as a luminance signal to said color subcarrier to produce a combined signal representative of said scene.

5. A television camera comprising a luminance pickup tube having a target or screen that is to be scanned by an electron beam, said tube having a deflection coil through which a deflection current is to flow for deflecting said beam horizontally at a comparatively fast rate to scan said target, said camera further comprising three color pickup tubes each having a target or screen that is to be scanned by an electron beam, said color pickup tubes each having deflection means to which a deflection wave is to be applied for deflecting the associated electron beam horizontally at said comparatively fast rate to scan the target, horizontal deflection circuit means for producing a repetitive horizontal deflection current which flows through said deflection coil, said deflection current having a waveform that includes a forward sweep portion and a return time portion, further horizontal deflection circuit means for producing a repetitive horizontal deflection wave which is applied to said horizontal deflecting means of the color pickup tubes, said deflection wave having a waveform that includes a forward sweep portion part of which occurs during the return time of said deflection current and having a comparatively short return time portion, means for producing an optical black strip along one side of each of said targets of the color pickup tubes, said strip being substantially at right angles to the direction of horizontal scan, optical means for imaging the scene to be transmitted on the targets of said four pickup tubes with the image in full color on the target of the luminance pickup tube, and with the image in three primary colors, respectively, on the targets of the color pickup tubes, the horizontal deflection wave applied to said horizontal deflecting means being made to deflect the associated electron beam across both the picture image and the optical black strip, whereby the output of each of said color pickup tubes comprises the picture signal obtained by each horizontal scan followed by a black level pedestal having a peak level that always is representative of picture black, alternating current amplifiers connected to amplify the outputs of said color pickup tubes, respectively, direct-current setting or clamping circuits for clamping said amplified outputs, respectively, to said black level pedestals, means for deriving from said clamped outputs of said color pickup tubes a color subcarrier which carries color difference signal representative of a scene, and means for adding the output of said luminance pickup tube as a luminance signal to said color subcarrier to produce a combined signal representative of said scene.

6. A television camera comprising a luminance pickup tube having a target or screen that is to be scanned by an electron beam, said tube having a deflection coil through which a deflection current is to flow for deflecting said beam horizontally at a comparatively fast rate to scan said target, said camera further comprising three color pickup tubes each having a target or screen that is to be scanned by an electron beam, said color pickup tubes each having deflection means to which a deflection wave is to be applied for deflecting the associated electron beam horizontally at said comparatively fast rate to scan the target, horizontal deflection circuit means for producing a repetitive horizontal deflection current which flows through said deflection coil, said deflection current having a waveform that includes a forward sweep portion and a return time portion, further horizontal deflection circuit means for producing a repetitive horizontal deflection wave which is applied to said horizontal deflecting means of the color pickup tubes, said deflection wave having a waveform that includes a forward sweep portion part of which occurs during the return time of said deflection current and having a comparatively short return time portion, means for producing an optical black strip along one side of each of said targets of the color pickup tubes, said strip being substantially at right angles to the direction of horizontal scan, optical means for imaging the scene to be transmitted on the targets of said four pickup tubes with the image in full color on the target of the luminance pickup tube, and with the image in three primary colors, respectively, on the targets of the color pickup tubes, the horizontal deflection wave applied to said horizontal deflecting means being made to deflect the associated electron beam across both the picture image and the optical black strip, whereby the output of each of said color pickup tubes comprises the picture signal obtained by each horizontal scan followed by a black level pedestal having a peak level that always is representative of picture black, means for blanking said luminance pickup tube at the end of each horizontal sweep to establish a luminance signal having black level pedestals, means for clamping said luminance signal to said black level pedestals, means for clamping the outputs of said color pickup tubes to their black level pedestals, means for deriving from said clamped outputs of said color pickup tubes a color subcarrier which carries color difference signals representative of a scene, and means for adding said clamped output of said luminance pickup tube as a luminance signal to said color subcarrier to produce a combined signal representative of said scene.

7. A television camera comprising a high resolution luminance pickup tube having a target or screen that is to be scanned by an electron beam, said tube having a deflection coil through which a deflection current is to flow for deflecting said beam horizontally at a comparatively fast rate to scan said target, said camera further comprising three color pickup tubes of the type having a photoconductive target or screen that is to be scanned by an electron beam, said three pickup tubes each having a pair of electrostatic deflection plates to which a deflection voltage is to be applied for deflecting the associated electron beam horizontally at said comparatively fast rate to scan the photoconductive target, horizontal deflection circuit means for producing a repetitive horizontal deflection current which flows through said deflection coil, said deflection current having a waveform that includes a forward sweep portion and a return time portion, further horizontal deflection circuit means for producing a repetitive horizontal deflection voltage which is applied to said horizontal deflecting plates, said deflection voltage having a waveform that includes a forward sweep portion part of which occurs during the return time of said deflection current and having a compartively short return time portion, means for producing an optical black strip along one side of each of said photoconductive targets, said strip being substantially at right angles to the direction of horizontal scan, optical means for imaging the scene to be transmitted on the targets of said four pickup tubes with the image in full color on the target of the high resolution luminance pickup tube, and with the image in three primary colors, respectively, on the targets of the color pickup tubes, the horizontal deflection voltage applied to said horizontal deflecting plates being made to deflect the associated electron beam across both the picture image and the optical black stirp, whereby the output of each of said color pickup tubes comprises the picture signal obtained by each horizontal scan followed by a black level pedestal having a peak level that always is representative of picture black, means for blanking said luminance pickup tube at the end of each horizontal sweep to establish a luminance signal having black level pedestals, means for clamping said luminance signal to said black level pedestals, means for clamping the outputs of said color pickup tubes to their black level pedestals, means for deriving from said clamped outputs of said color pickup tubes a color subcarrier which carries color difference signals representative of a scene, and means for adding said clamped output of said high resolution luminance pickup tube as a luminance signal to said color subcarrier to produce a combined signal representative of said scene.

References Cited in the file of this patent

UNITED STATES PATENTS 2,738,379 James et al. ............ Mar. 13, 1956